United States Patent [19]

Traenckner et al.

[11] 4,253,918

[45] Mar. 3, 1981

[54] AIR-DRYING COATING COMPOSITIONS

[75] Inventors: Hans-Joachim Traenckner; Hans J. Rosenkranz; Hans Rudolph, Krefeld, all of Fed. Rep. of Germany

[73] Assignee: Pfizer Inc., New York, N.Y.

[21] Appl. No.: 586,886

[22] Filed: Jun. 16, 1975

[30] Foreign Application Priority Data

Jun. 20, 1974 [DE] Fed. Rep. of Germany ....... 2429527

[51] Int. Cl.³ .................................................. C08F 2/46
[52] U.S. Cl. ........................... 204/159.22; 204/159.15; 204/159.16; 204/159.19; 427/44; 428/514; 525/531; 525/922; 528/418
[58] Field of Search ......... 260/47 EP, 2 EP, 78.4 EP, 260/88.3 A, 837 R; 204/159.15, 159.16, 159.19, 159.22; 525/531, 922; 528/418

[56] References Cited

U.S. PATENT DOCUMENTS

| | | | |
|---|---|---|---|
| 3,317,465 | 5/1967 | Doyle et al. | 260/836 |
| 3,336,253 | 8/1967 | Wong et al. | 260/29.2 EP |
| 3,450,613 | 6/1969 | Steinberg | 260/2 EP |
| 3,728,240 | 4/1973 | Lard | 204/159.16 |
| 3,845,056 | 10/1974 | Robson et al. | 204/159.16 |
| 3,847,769 | 11/1974 | Garratt et al. | 260/836 |
| 3,914,165 | 10/1975 | Gaske | 204/159.14 |
| 3,929,927 | 12/1975 | Marans et al. | 260/836 |
| 3,971,834 | 7/1976 | Uzelmeier et al. | 204/159.16 |
| 3,979,270 | 9/1976 | Trecker et al. | 204/159.14 |

*Primary Examiner*—Melvyn I. Marquis
*Attorney, Agent, or Firm*—Connolly and Hutz

[57] ABSTRACT

Air-drying unsaturated coating compositions are obtained by reacting at least 60% of the epoxide groups of a polyepoxid with more than one epoxid group per molecule (a) with 0.01 to 0.5 NH-equivalents, based on one epoxide group of ammonia, an aliphatic or cycloaliphatic primary or secondary amine and subsequently (b) with 0.99 to 0.5 carboxyl equivalents, based on one epoxide group of acrylic or methacrylic acid.

The reaction products may be mixed with solvents and/or copolymerizable monomers and are preferably hardened in the presence of known photoinitiators with the aid of energy radiation.

Their particular advantages are their stability in the dark and that they also harden very quickly in the presence of atmospheric oxygen.

Preferred substrates are paper and cardboards.

13 Claims, No Drawings

AIR-DRYING COATING COMPOSITIONS

This invention relates to new nitrogen-containing, unsaturated resins of polyepoxides, ammonia, aliphatic or cycloaliphatic monoamines and (meth) acrylic acid, optionally in combination with polymerisable monomers, for air-drying coating compositions.

The reaction of glycidyl ethers of bisphenol A with acrylic acid results in the formation of resin-like products which, by virtue of their vinyl group content, are capable of being crosslinked by a radical polymerisation reaction. Systems of this kind are described, for example, in British Pat. No. 1,006,587 or in U.S. Pat. No. 3,317,465. Solutions of these reaction products in vinyl monomers, such as acrylic or methacrylic acid esters or even styrene, are used as cast resins which are characterised in particular by their high resistance to hydrolysis.

Like solutions of unsaturated polyester resins in styrene, these products are hardened by the addition of organic peroxides and, optionally, accelerators, for example, cobalt salts. It is also known that reaction products of epoxy resins and acrylic acid, dissolved in acrylic acid esters, can be provided with a photo-initiator and hardened by the action of UV-light. Products of this kind, which are described in German Offenlegungsschrift No. 2,126,419, are used as special dental filling compounds.

However, attempts to use such systems of UV-light-hardening coating compositions in the form of thin layers have shown that their crosslinking velocity, especially in the presence of atmospheric oxygen, is too low for practical requirements. As a rule, thin layers of these compositions retain an extremely tacky surface.

On the other hand, it is known from German Offenlegungsschrift No. 2,221,335 that monomer-free unsaturated polyesters, in layer thicknesses of up to 50μ, can be hardened by UV-light in the presence of photo-initiators. The hardening times amounts to from 2 to 15 seconds, depending upon the type of photo-initiator.

The object of the present invention is to modify the known systems of reaction products of polyepoxides and (meth)acrylic acid in such a way that, even when dried in air in the form of thin layers, they can be hardened by UV-light or other high-energy rays in the presence of photo-initiators as quickly as or, if possible, more quickly than conventional unsaturated polyesters. Another object of the invention is to enable copolymerisable monomers to be optionally used. Yet another object of the invention is to enable the new systems to be hardened at room temperature in the presence of radical donors without any need for exposure to UV-light or other high-energy rays.

According to the invention, these objects are achieved by reacting at least 60% of the epoxide groups in polyepoxide compounds with 0.01 to 0.5 NH-equivalents per epoxide group of ammonia, an aliphatic or cycloaliphatic primary or secondary amine and then with 0.5 to 0.99 carboxyl equivalents per epoxide group of methacrylic or acrylic acid.

Accordingly, the invention provides a process for the production of air-drying coating compositions based on reaction products of polyepoxides and α,β-monoolefinically unsaturated carboxylic acids, characterised by the fact that at least 60% of the epoxide groups of polyepoxide with more than one epoxide group per molecule are reacted.

(a) with from 0.01 to 0.5 NH-equivalents, based on one epoxide equivalent, of ammonia or an aliphatic or cycloaliphatic primary or secondary amine or a mixture of the aforementioned nitrogen compounds, and then (b) with 0.99 to 0.5 carboxyl equivalents, based on one epoxide equivalent, of acrylic acid or methacrylic acid or a mixture of acrylic acid and methacrylic acid.

The invention also provides products obtained by the process, i.e. air-drying coating compositions containing reaction products of a polyepoxide with more than one epoxide group per molecule, at least 60% of the epoxide groups of which have been reacted (a) with 0.01 to 0.5 NH-equivalents, based on one epoxide equivalent, of ammonia or an aliphatic or cycloaliphatic primary or secondary amine or a mixture of the aforementioned nitrogen compounds, and then (b) with 0.99 to 0.5 carboxyl equivalents, based on one epoxide equivalent, of acrylic acid or methacrylic acid or a mixture of acrylic acid and methacrylic acid.

In the context of the invention, polyepoxides are compounds which contain more than one epoxide groups (such as 2,3 epoxy propyl group) per molecule, preferably 1.6 to 6 and, more especially, 1.6 to 3 epoxide groups. In addition, one epoxide equivalent is the quantity of an epoxide in grams which contains one epoxide group.

The polyepoxide compounds used may be polyglycidyl ethers of polyhydric phenols, for example of pyrocatechol, resorcinol, hydroquinone, of 4,4'-dihydroxy diphenyl methane, of 4,4'-dihydroxy-3,3'-dimethyl diphenyl methane, of 4,4'-dihydroxy diphenyl dimethyl methane (bisphenol A), of 4,4'-dihydroxy diphenyl methyl methane, of 4,4'-dihydroxy diphenyl cyclohexane, of 4,4'-dihydroxy-3,3'-dimethyl diphenyl propane, of 4,4'-dihydroxy diphenyl, of 4,4'-dihydroxy diphenyl sulphone, of tris-(4-hydroxy phenyl)-methane, of the chlorination and bromination products of the aforementioned diols, in particular of bisphenol A; of novolaks (i.e. reaction products of monohydric or polyhydric phenols with aldehydes, especially formaldehyde, in the presence of acid catalysts), of diphenols obtained by esterifying 2 mols of the sodium salt of an aromatic hydroxy carboxylic acid with 1 mol of a dihalogen alkane or dihalogen dialkyl ether (cf. British Pat. No. 1.017,612), of polyphenols obtained by condensing phenols and long-chain halogen paraffins containing at least 2 halogen atoms (cf. British Pat. No. 1,024,288).

Other suitable polyepoxide compounds are glycidyl ethers of polyhydric alcohols, for example of 1,4-butane diol, 1,4-butene diol, glycerol, trimethylol propane, pentaerythritol and polyethylene glycols, Triglycidyl isocyanurate, N,N'-diepoxy propyl oxamide, polyglycidyl thioethers of polyhydric thiols, for example of bis-mercaptomethyl benzene, diglycidyl trimethylene trisulphone, are also suitable.

Other suitable polyepoxide compounds include glycidyl esters of polyvalent aromatic, aliphatic and cycloaliphatic carboxylic acids, for example phthalic acid diglycidyl ester, isophthalic acid diglycidyl ester, terephthalic acid diglycidyl ester, tetrahydrophthalic acid glycidyl ester, adipic acid diglycidyl ester, hexahydrophthalic acid diglycidyl ester, which may optionally be substituted by methyl groups, and glycidyl esters of reaction products of 1 mol of an aromatic or cycloaliphatic dicarboxylic acid anhydride and ½ mol of a diol or 1/n mol of a polyol with n hydroxyl groups, for example glycidyl carboxylic acid esters corresponding to the general formula:

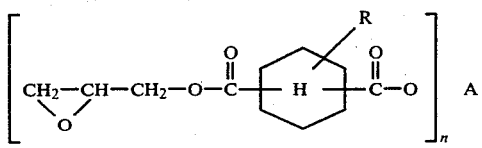

in which A represents an at least divalent radical of an aliphatic hydrocarbon optionally interrupted by oxygen and/or one or more cycloaliphatic rings, or the divalent radical of a cycloaliphatic hydrocarbon; R represents hydrogen or an alkyl radical with 1 to 3 carbon atoms and n is a number between 2 and 6, or mixtures of glycidyl carboxylic acid esters corresponding to the above general formula (cf. British Pat. No. 1,220,702).

The following polyepoxide compounds or mixtures thereof are preferably used for the process according to the invention: polyglycidyl ethers of polyhydric phenols, in particular of bisphenol A; phthalic acid diglycidyl ester, isophthalic acid diglycidyl ester, terephthalic acid glycidyl ester, polyglycidyl ester of cycloaliphatic dicarboxylic acids, especially hexahydrophthalic acid diglycidyl ester and polyepoxides of the reaction product of n mols of hexahydrophthalic acid anhydride and/or phthalic acid anhydride and 1 mol of a polyol with n hydroxyl groups (n=integer from 2 to 6), more especially of 3 mols of hexahydrophthalic acid anhydride and/or phthalic acid anhydride and 1 mol of 1,1,1-trimethylol propane.

Bisphenol A polyglycidyl ethers are particularly preferred.

One or more nitrogen compounds corresponding to the formula

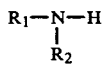

are used for the process according to the invention. In this formula, $R_1$ and $R_2$ may be the same or different and represent hydrogen; $C_1$-$C_{18}$ alkyl, preferably $C_1$-$C_6$ alkyl; hydroxy alkyl with 2 to 18 and preferably with 2 to 4 carbon atoms in the alkyl portion; β-alkoxy alkyl with 2 to 18 and preferably with 2 to 4 carbon atoms in the alkyl portion and 1 to 4 carbon atoms in the alkoxy radical; β-alkoxy carbonyl alkyl with 2 to 18 carbon atoms, preferably with 2 to 4 carbon atoms in the alkyl radical and 1 to 4 carbon atoms in the alkoxy radical; β-cyanoalkyl with 1 to 18 carbon atoms and preferably with 2 to 6 carbon atoms in the alkyl radical; N-dialkylaminoalkyl with 1 to 12 carbon atoms and preferably with 2 to 4 carbon atoms in the alkyl radical and 1 to 4 carbon atoms in the N-alkyl amino group; in addition $R_1$ and $R_2$, together with the nitrogen atom, may form a piperidine or pyrrolidine ring. The alkyl groups may be linear or branched.

Preferred compounds are those in which $R_1$ and/or $R_2$ represent hydrogen, alkyl and β-hydroxy alkyl.

The following compounds are mentioned by name: ammonia, methyl amine, dimethyl amine, ethyl amine, diethyl amine, n-propyl amine, di-n-propyl amine, isopropyl amine, diisopropyl amine, n-butyl amine, di-n-butyl amine, methyl propyl amine, ethyl methyl amine, butyl methyl amine, ethyl butyl amine, sec-butyl amine, isobutyl amine, diisobutyl amine, tert.-butyl amine, di-tert.butyl amine, n-amyl amine, methyl isoamyl amine, cyclohexyl amine, dicyclohexyl amine, methyl cyclohexyl amine, ethyl cyclohexyl amine, propyl cyclohexyl amine, cyclopentyl amine, dicyclopentyl amine, cyclopentyl methyl amine, pyrrolidine, piperidine, ethanol amine, 3-amino-1-propanol, 1-amino-2-propanol, N-methyl ethanolamine, N-phenyl ethanolamine, 1-amino-3-butanol, N-cyclohexyl ethanolamine, N-dodecyl ethanolamine, N-cyclohexyl isopropyl amine, diethanolamine, diisopropanolamine, 2-amino-2-methyl-3-propane diol, N,N-dimethyl ethylene diamine, N,N-diethyl ethylene diamine, N-trimethyl ethylene diamine and N-triethyl ethylene diamine.

The following compounds in particular are used: ammonia, ethanolamine, diethanolamine, 1-amino-2-propanol (=isopropanol amine), diisopropanolamine, dimethyl amine, diethyl amine, dibutyl amine, methyl amine, ethyl amine, butyl amine(s).

From 0.01 to 0.5 and preferably from 0.05 to 0.3 NH-equivalents of ammonia or of the aforementioned amines are used per epoxide equivalent. One NH-equivalent is the quantity of ammonia or amine in grams which contains 1 gram-atom of nitrogen-bonded hydrogen.

Reaction of the nitrogen compounds with the polyepoxides may be carried out in different ways, for example either as such or in an inert solvent for example methanol, ethanol, propanol, isopropanol, butanol, isobutanol, sec-butanol, tert.-butanol, cyclohexanol, 2-ethyl-1-hexanol, benzene, xylene, toluene, hexane, heptane, octane, isooctane, cyclopentane, cyclohexane, cycloheptane, cyclopentanone, cyclohexanone, acetic acid methyl ester, acetic acid ethyl ester, acetic acid propyl ester, acetic acid-n-butyl ester, chloroform, carbon tetrachloride, trichloroethane dichloroethane, tetrachloroethane and chlorobenzene. The reaction may readily be carried out at temperatures in the range from 20° C. to 90° C. and preferably at temperatures in the range from 40° C. to 90° C. In exceptional cases, the reaction temperatures may even be above or below these ranges.

The reaction products of the polyepoxides with ammonia and/or the aforementioned amines are β-hydroxy propyl ethers, are soluble in organic solvents and are not crosslinked. In either case, they contain free epoxide groups.

Reaction of the polyepoxides with the nitrogen compounds is followed by reaction of the resulting products with acrylic and/or methacrylic acid. 0.5 to 0.99 carboxyl equivalents and preferably 0.7 to 0.95 carboxyl equivalents of (meth)acrylic acid are used to one epoxide equivalent.

1 carboxyl equivalent is the quantity of carboxylic acid in grams which contains 1 gram-mol of carboxyl groups.

Addition of the acrylic and/or methacrylic acid to the polyepoxides reacted with ammonia and/or the amines is carried out by known methods, for example by the process described in U.S. Pat. Nos. 3,301,743 or 2,824,851 either as such or in the solvents mentioned in reference to the reaction of the polyepoxides with the nitrogen compounds. If desired, addition of the (meth)acrylic acid may be carried out in the presence of about 0.01 to 3% by weight, based on the starting epoxide, of catalysts such as tertiary amines, alkali hydroxides, alkali salts of organic carboxyl acids, mercaptans, dialkyl sulphides, bis-(hydroxy alkyl)-sulphides, sulphonium and phosphonium compounds, phosphines, arsines or stibines. The reaction is best carried out at temperatures in the range from 40° C. to 90° C., although, in special cases, the reaction temperatures may be above or below this range.

In the end products, at least 60% of the epoxide groups present in the starting polyepoxide, and preferably 65 to 95%, should be reacted with the aforementioned nitrogen compounds and(meth)acrylic acid. However, it is even possible for all the epoxide groups to be reacted.

In order to protect the polymerisable reaction products according to the invention against undesirable premature polymerisation, it is advisable to add from 0.001 to 0.1% by weight, based on the total mixture, of polymerisation inhibitors or antioxidants during the actual preparation of the reaction products.

Suitable auxiliaries of this kind are, for example, phenols and phenol derivatives, preferably sterically hindered phenols with alkyl substituents containing 1 to 6 carbon atoms in both o-positions to the phenolic hydroxy group, amines, preferably secondary acryl amines and their derivatives, quinones, copper(I) salts of organic acids or addition compounds of copper(I)halides with phosphites.

The following auxiliaries are mentioned by name: 4,4'-bis-(2,6-di-tert.-butyl phenol), 1,3,5-trimethyl-2,4,6-tris(3,5-di-tert.-butyl-4-hydroxy benzyl)-benzene, 4,4'-butylidene-bis-(6-tert.-butyl-m-cresol), 3,5-di-tert.-butyl-4-hydroxy benzyl phosphonic acid diethyl ester, N,N'-bis-($\beta$-naphthyl)-p-phenylene diamine, N,N'-bis-(1-methyl heptyl)-p-phenylene diamine, phenyl-$\beta$-naphthylamine, 4,4'-bis-($\alpha$,$\alpha$-dimethyl benzyl)diphenyl amine, 1,3,5-tris-(3,5-di-tert.-butyl-4-hydroxy hydrocinnamoyl)-hexahydro-s-triazine, hydroquinone, p-benzo quinone, 2,5-di-tert.-butyl quinone, toluhydroquinone, p-tert.-butyl pyrocatechol, 3-methyl pyrocatechol, 4-ethyl pyrocatechol, chloranil, naphthoquinone, copper naphthenate, copper octoate, Cu(I)Cl/triphenyl phosphite, Cu(I)Cl/trimethyl phosphite, Cu(I)Cl/trischloroethyl phosphite, Cu(I)Cl/tripropyl phosphite and p-nitrosodimethyl aniline.

Other suitable stabilisers are described in "Methoden der organischen Chemie" (Houben-Weyl), 4th Edition, Vol XIV/1, pages 433–452, 756, Georg Thieme Verlag, Stuttgart, 1961. p-Benzoquinone and/or hydroquinone monomethyl ether, for example, are particularly suitable in a concentration of from 0.001 to 0.005% by weight, based on the mixture as a whole.

The reaction products according to the invention may occasionally be used without the addition of copolymerisable monomers or solvents. However, since they are frequently highly viscous products, it is advisable to mix them with copolymerisable monomers in order to obtain processible viscosities and/or to vary the properties of the hardening products.

The following monomers are suitable:
(1) Esters of acrylic acid or methacrylic acid with aliphatic $C_1$–$C_8$, cycloaliphatic $C_5$–$C_6$, araliphatic $C_7$–$C_8$ monoalcohols, for example methyl acrylate, ethyl acrylate, n-propyl acrylate, n-butyl acrylate, methyl hexyl acrylate, 2-ethyl acrylate and the corresponding methacrylic acid esters; cyclopentyl acrylate, cyclohexyl acrylate or the corresponding methacrylic acid esters; benzyl acrylate, $\beta$-phenyl ethyl acrylate and corresponding methacrylic acid esters;
(2) Hydroxy alkyl esters of acrylic acid or methacrylic acid with 2 to 4 carbon atoms in the alcohol component, such as hydroxy ethyl acrylate, 2-hydroxy propyl acrylate, 3-hydroxy propyl acrylate, 2-hydroxy butyl acrylate, 4-hydroxy butyl acrylate or corresponding methacrylic acid esters;
(3) Diacrylates and polyacrylates, also dimethacrylates and polymethacrylates of glycols with 2 to 6 carbon atoms and polyols with 3 to 4 hydroxyl groups and 3 to 6 carbon atoms, such as ethylene glycol diacrylate, 1,3-propane diol diacrylate, 1,4-butane diol diacrylate, 1,6-hexane diol diacrylate, trimethylol propane triacrylate, pentaerythritiol triacrylate and tetraacrylate and corresponding methacrylates, also di(meth)acrylates of polyether glycols of glycol, 1,3-propane diol and 1,4-butane diol;
(4) Aromatic vinyl and divinyl compounds such as styrene, methyl styrene and divinyl benzene;
(5) N-methylol acrylamide or N-methylol methacrylamide and corresponding N-methylol alkyl ethers with 1 to 4 carbon atoms in the alkyl ether group and corresponding N-methylol allyl ethers, especially N-methoxy methyl(meth)acrylamide, N-butoxy methyl(meth)acrylamide and N-allyloxy methyl(meth)acrylamide;
(6) Vinyl alkyl ethers with 1 to 4 carbon atoms in the alkyl group, such as vinyl methyl ether, vinyl ethyl ether, vinyl propyl ether, vinyl butyl ether;
(7) Trimethylol propane diallyl ether mono(meth)acrylate, vinyl pyridine, N-vinyl carbazole, triallyl phosphate, triallylisocyanurate and others.

It is also possible to use mixtures of one or more of the aforementioned monomers. The additions are made in quantities of from about 5 to 50% by weight and preferably in quantities of from 20 to 40% by weight, based on the mixture of reaction products according to the invention and additional monomers.

It is also possible to adjust a suitable viscosity by admixture with inert solvents such as butyl acetate, ethyl acetate, acetone, ethyl methyl ketone, diethyl ketone, cyclohexane, cyclohexanone, cyclopentane, cyclopentanone, n-heptane, n-hexane, n-octane, isooctane, methylene chloride, chloroform, 1,1-dichloroethane, 1,2-dichloroethane, 1,1,2-trichloroethane, carbon tetrachloride. In order to obtain a processible viscosity, solvents may be added in quantities of from 5 to 50% by weight and preferably in quantities of from 20 to 40% by weight, based on the mixture of reaction product according to the invention and solvent.

It is of course also possible to use mixtures of additional monomers and solvents within the quantitative ratios indicated.

Hardening (air drying) of the reaction products according to the invention, optionally in admixture with other copolymerisable monomers, may be carried out by high-energy radiation, such as UV-light, electron rays, gamma rays or in the presence of radical donors, such as thermal polymerisation initiators.

The reaction products according to the invention are preferably used in the form of coating compositions hardenable by UV-light, their particular advantage being that they also harden very quickly in the presence of atmospheric oxygen. Photoinitiators have to be added for this particular application.

Suitable photoinitiators are the compounds normally used for this purpose, for example benzophenone and, generally, aromatic keto compounds derived from benzophenone, such as alkyl benzophenones, halogenmethylated benzophenones according to German Offenlegungsschrift No. 1,949,010, Michlers ketone, anthrone, halogenated benzophenones. Other suitable photoinitiators are benzoin and its derivatives, for example according to German Offenlegungsschriften Nos. 1,769,168; 1,769,853; 1,769,854; 1,807,297; 1,807,301; 1,919,678 and German Auslegeschrift No. 1,694,149. Other effective photoinitiators include anthraquinone and many of its derivatives, for example β-methyl anthraquinone, tert.butyl anthraquinone and anthraquinone carboxylic acid esters, also oxime esters according to German Offenlegungsschrift No. 1,795,089.

In cases where the reaction products according to the invention are hardened without the addition of other monomers, the oxime esters according to German Offenlegungsschrift No. 1,795,089 and the benzophenone derivatives according to German Offenlegungsschrift No. 1,949,010, are preferably used as photoinitators.

It is particularly preferred to use benzoin derivatives corresponding to the general formula

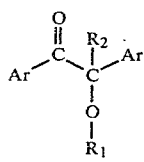

during hardening of the reaction products according to the invention, optionally in the presence of other monomers. In the above formula, Ar represents an aromatic radical optionally substituted by alkyl, alkoxy, halogen;

$R_1$ represents a linear or branched alkyl radical with ($C_1$-$C_{12}$), cycloalkyl such as cyclohexyl, tetrahydropyranyl, 1-methoxy ethyl;

$R_2$ represents allyl, benzyl, optionally substituted by halogen, or the radical —$CH_2$—$CH_2$—X, where X=CN, $CONH_2$, $COOR_3$ and $R_3$=H, lower alkyl ($C_1$-$C_{10}$).

Preferably, Ar=phenyl, $R_1$=a linear or branched alkyl radical with 1 to 4 carbon atoms and $R_2$=alkyl or the radical —$CH_2$—$CH_2$—X where X=CN and $COOR_3$ ($R_3$=$C_1$-$C_4$ alkyl).

Suitable compounds of this type (cf. German Offenlegungsschrift No. 1,769,854) are for example the following: α-allyl benzoin methyl ether, α-allyl benzoin isopropyl ether, α-allyl benzoin ethyl ether, α-allyl benzoin butyl ether, α-allyl benzoin propyl ether, α-allyl benzoin octyl ether, α-allyl benzoin dodecyl ether, α-benzyl benzoin methyl ether, α-benzyl benzoin ethyl ether, α-benzyl benzoin propyl ether, α-benzyl benzoin isopropyl ether, α-benzyl benzoin butyl ether, α-(2-cyanoethyl)-benzoin methyl ether, α-(2-cyanoethyl)-benzoin ethyl ether, α-(2-cyanoethyl)-benzoin propyl ether, α-(2-cyanoethyl)-benzoin isopropyl ether, α-(2-cyanoethyl)-benzoin butyl ether, α-(2-cyanoethyl)-benzoin isobutyl ether, α-(2-cyanoethyl)-benzoin hexyl ether, α-(2-cyanoethyl)-benzoin octyl ether, α-(2-cyanoethyl)-benzoin dodecyl ether, α-(2-cyanoethyl)-benzoin isooctyl ether, α-(2-carboxyethyl)-benzoin methyl ether, α-(2-carboxyethyl)-benzoin ethyl ether, α-(2-carboxyethyl)-benzoin propyl ether, α-(2-carboxyethyl)-benzoin isopropyl ether, α-(2-carboxyethyl)-benzoin butyl ether, α-(2-carboxyethyl)-benzoin isobutyl ether, α-(2-carboxyethyl)-benzoin hexyl ether, α-(2-carboxyethyl)-benzoin octyl ether, α-(2-carboxyethyl)-benzoin dodecyl ether, α-(2-carboxyethyl)-benzoin isooctyl ether, α-(2-carbomethoxyethyl)-benzoin methyl ether, α-(2-carbomethoxyethyl)-benzoin ethyl ether, α-(2-carbomethoxyethyl)-benzoin propyl ether, α-(2-carbomethoxyethyl)-benzoin isopropyl ether, α-(2-carbomethoxyethyl)-benzoin butyl ether, α-(2-carbomethoxyethyl)-benzoin isobutylether, α-(2-carbomethoxylethyl)-benzoin hexyl ether, α-(2-carbomethoxy ethyl)-benzoin octyl ether, α-(2-carbomethoxylethyl)-benzoin dodecyl ether, α-(2-carbomethoxylethyl)-benzoin isooctyl ether, α-(2-carboethoxyethyl)-benzoin methyl ether, α-(2-carboethoxy ethyl)-benzoin ethyl ether, α-(2-carboethoxyethyl)-benzoin propyl ether, α-(2-carboethoxyethyl)-benzoin isopropyl ether, α-(2-carboethoxyethyl)-benzoin butyl ether, α-(2-carboethoxyethyl)-benzoin isobutylether, α-(2-carboethoxyethyl)-benzoin hexyl ether, α-(2-carboethoxyethyl)-benzoin octyl ether, α-(2-carboethoxyethyl)-benzoin dodecyl ether, α-(2-carboethoxyethyl)-benzoin isooctyl ether, α-(2-carbopropoxyethyl)-benzoin methyl ether, α-(2-carbopropoxyethyl)-benzoin ethyl ether, α-(2-carbopropoxyethyl)-benzoin propyl ether, α-(2-carbopropoxyethyl)-benzoin isopropyl ether, α-(2-carbopropoxyethyl)-benzoin butyl ether, α-(2-carbopropoxyethyl)-benzoin isobutyl ether, α-(2-carbopropoxyethyl)-benzoin hexyl ether, α-(2-carbopropoxyethyl)-benzoin octyl ether, α-(2-carbopropoxyethyl)-benzoin dodecyl ether, α-(2-carbopropoxyethyl)-benzoin isooctyl ether, α-(2-carbo-n-butoxyethyl)-benzoin methyl ether, α-(2-carbo-n-butoxyethyl)-benzoin ethyl ether, α-(2-carbo-n-butoxyethyl)-benzoin propyl ether, α-(2-carbo-n-butoxyethyl)-benzoin isopropyl ether, α-(2-carbo-n-butoxyethyl)-benzoin butyl ether, α-(2-carbo-n-butoxyethyl)-benzoin isobutyl ether, α-(2-carbo-n-butoxyethyl)-benzoin hexyl ether, α-(2-carbo-n-butoxyethyl)-benzoin octyl ether, α-(2-carbo-n-butoxyethyl)-benzoin dodecyl ether, α-(2-carbo-n-butoxyethyl)-benzoin isooctyl ether, α-(2-carboisooctoxyethyl)-benzoin methyl ether, α-(2-carboisooctoxyethyl)-benzoin ethyl ether, α-(2-carboisooctoxyethyl)-benzoin propyl ether, α-(2-carboisooctoxyethyl)-benzoin isopropyl ether, α-(2-carboisooctoxyethyl)-benzoin butyl ether, α-(2-carboisooctoxyethyl)-benzoin isobutyl ether, α-(2-carboisooctoxyethyl)-benzoin hexyl ether, α-(2-carboisooctoxyethyl)-benzoin octyl ether, α-(2-carboisooctoxyethyl)-benzoin dodecyl ether, α-(2-carboisooctoxyethyl)-benzoin isooctyl ether, α-(2-carbonamidoethyl)-benzoin methyl ether, α-(2-cyanoethyl)-benzoin tetrahydropyranyl ether, α-(2-cyanoethyl)-benzoin-(1-methoxy ethyl ether), α-(2-carbomethoxyethyl)-benzoin tetrahydropyranyl ether, α-(2-carboethxyethyl)-benzoin-(1-methoxyethyl ether), α-(2-carbo-n-butoxyethyl)-benzoin tetrahydropyranyl ether, α-(2-carboisooctoxyethyl)-benzoin tetrahydropyranyl ether.

By using these special α-substituted benzoin derivatives as photoinitiators, it is surprisingly possible to produce UV-light-hardening mixtures based on polyfunctional acrylic acid esters which combine the characteristics of extremely high reactivity under the effect of UV-light with virtually unlimited storability in the dark.

The use of benzoin derivatives, especially benzoin ethers, as photoinitiators is known and described in detail in the literature (for example H.-G. Heine, H.-J. Rosenkranz, H. Rudolph, Angew. Chemie 84, 1032–1036, 1972). However, it is also known that, in the past, numerous attempts have been made to improve the unsatisfactory storability of systems, consisting of polymerisable resins containing vinyl groups, vinyl monomers, and benzoin derivatives as photoinitiators, by means of stabilisers (cf. German Auslegeschrift No. 1,902,930) or by selecting certain benzoin derivatives. The problem of storability in the dark, in particular as it affects the system now widely used in the lacquer industry consisting of unsaturated polyester resin and styrene, has been satisfactorily solved by the use of secondary benzoin ethers (cf. German Auslegeschrift No. 1,694,149). The α-substituted benzoin derivatives preferably used in accordance with the present invention are also distinguished in UV-light-hardening unsaturated polyester resins by good storability in the dark (cf. U.S. Pat. No. 3,607,693).

However, so far as the present UV-light-hardening resin systems containing acrylic-acid-modified epoxy resins are concerned, it has not yet been possible to find any benzoin-based photoinitiator which would give mixtures of even limited storability in the dark. In the present, highly reactive resin system, benzoin derivatives which may be used in unsaturated polyester resins to form storable mixtures, for example benzoin ethers of secondary alcohols, result in total gelation after storage for only a few hours at 60° C. or after storage for 1 day at room temperature.

So far as its polymerisability is concerned, this system is several times more reactive than, for example, monofunctional acrylic acid esters or unsaturated polyester resins.

It was therefore surprising and by no means foreseeable, that storability in the dark should not be adversely affected by the use of α-alkylated benzoin ethers as photoinitiators in this resin system. At the same time, these photoinitiators show an outstanding level of reactivity which is by no means reduced by comparison with known benzoin derivatives.

Hitherto, it has only been possible to produce storable, highly reactive coating compositions with this reactivity and for the same applications by using a photoinitator mixture consisting of benzophenone or benzil and Michlers ketone. Disclosures to this effect may be found, for example, in German Offenlegungsschrift No. 2,345,624. Where hardening is carried out under UV light, however, an initiator mixture of this kind results in the formation of intensively yellow coloured coatings, so that its use for this particular application is seriously restricted.

By contrast, α-substituted benzoin derivatives cause hardly any discoloration in thin layers (2–20μ). Accordingly, the UV-light-hardening compositions produced with them are particularly suitable for coating paper, light woods and plastics.

The aforementioned photoinitiators which are used in quantities of from 0.1 to 20% by weight and preferably in quantities of from 0.1 to 5% by weight, based on polymerisable components, depending upon the purpose for which the compositions according to the invention are used, may be used individually or, by virtue of frequent advantage synergistic effects, even in combination with one another.

In many cases, it can be advantageous to use other additives whether to improve the film-forming properties of the resin compositions or to provide the layers with a particularly scratch-resistant surface. Thus, the resin compositions may be mixed with other resins, for example with saturated or unsaturated polyester resins. These resins are preferably used in quantities of from 1 to 50% by weight, based on the polymerisable components. Basically, however, these resins should only be used in quantities restricted to such an extent that they do not in any way affect reactivity. Suitable lacquer-grade resins of the type commonly used in the lacquer industry are described in Lackrohstofftabellen by E. Karsten, 5th Edition, Curt R. Vincentz Verlag, Hanover, 1972, pages 74–106, 195–258, 267–293, 335–347, 357–366.

Advantageous additives by which reactivity may be further increased are certain tertiary amines, for example, triethyl amine and triethanolamine. The addition of mercapto compounds such as dodecyl mercaptan, thioglycolic acid esters, thiophenol or mercapto ethanol, is similarly effective. The aforementioned substances are preferably used in quantities of up to 5% by weight, based on the polymerisable components.

The radiation sources used for carrying out the photo polymerisation reaction may be artificial radiation sources whose emission is in the range from 2500 to 5000 Å and preferably in the range from 3000 to 4000 Å. It is of advantage to use mercury vapour, xenon and tungsten lamps, more especially high-pressure mercury lamps.

In general, layers of the reaction products according to the invention with a thickness of from 1 μm to 1 mm (1 μm = $10^{-3}$ mm) can be hardened in less than 1 second to form a film when exposed to the light of a high-pressure mercury lamp, for example of the HTQ-7 type manufactured by Philips, from a distance of approximately 8 cm.

In cases where fillers are used in the resin compositions according to the invention employed as UV-light-hardening coatings, their use is limited to fillers which do not interfere with polymerisation through their absorption behaviour. For example talcum, heavy spar, chalk, gypsum, silicas, asbestos powder and light spar, may be used as light-permeable fillers.

In cases where hardening is carried out under the effect of thermal initiators of high-energy rays, for example electron rays or gamma-rays, it is possible in principle to use any fillers, pigments and reinforcing materials of the kind normally used in lacquer chemistry.

In cases where the resins according to the invention are hardened in the presence of 0.1 to 10.0% by weight, based on polymerisable components, of thermal polymerisation initiators, the layer thicknesses may be from 1 μm to 1 mm.

Suitable thermal polymerisation initiators are, for example, diacyl peroxides such as diacetyl, peroxide, dibenzoyl peroxide, di-p-chlorobenzoyl peroxide, dilauroyl peroxide, peroxy esters such as tert.-butyl peroxy dicarbonate, alkyl peroxides such as bis-(tert.-butyl peroxy butane), dicumyl peroxide, tert.-butyl cumyl peroxide, tert.-butyl cumyl peroxide, hydroperoxides such as cumene hydroperoxide, tert.-butyl hydroperoxide, ketone peroxides such as cyclohexanone hydroperoxide, methyl ethyl ketone hydroperoxide, acetyl acetone peroxide or azodiisobutyrodinitrile. In many cases, it is advantageous to add accelerators, such as aromatic amines, cobalt or vanadium salts of organic acids, to the thermal polymerisation initiators.

The drying times of the reaction products according to the invention, optionally in admixture with other copolymerisable monomers and/or solvents, in the presence of thermal polymerisation initiators and, optionally, accelerators, may amount to between 5 hours and 8 hours.

The coating compositions may be applied to suitable substrates by the methods normally used in the lacquer industry, such as spray coating, roll coating, knife coating, printing, dip coating, flood coating, spread coating and brush coating.

Suitable substrates include paper, various types of cardboard, leather, wood, plastics, textiles, ceramic materials, metals, but preferably paper and cardboards. Since the coating compositions harden in times ranging from fractions of a second to a few seconds to form films with excellent mechanical properties, it is possible for example to adapt a paper coating process to the processing speeds normally encountered in the field of printing.

The viscosities quoted in the Examples were measured in DIN-4-cup (4 mm orifice) according to DIN 53211, and are expressed as the flow out time in seconds.

The Philips HTQ-7 lamp used is a high-pressure mercury lamp manufactured by the Philips Company.

The pendulum hardness are determined with Koenig's pendulum in accordance with DIN 53 157, May 1971 Edition.

Droplet drying is the degree of drying determined in accordance with DIN 53 150, April, 1971 Edition.

The stamp test is a test used to determine the surface drying of air-drying lacquer binders. In this test, blue paper is pressed onto the surface by means of a screen. The blue paper impression in the lacquer surface is a measure of the degree of drying. The degree of drying is assessed in the following stages: 0=dry; 1=almost tack-free; 2=dust dry; 3=tacky; 4=highly tacky; f=liquid.

The percentage contents in the Examples relate to weight.

EXAMPLE 1

6800 g of bisphenol-A-bis-glycidyl ether (epoxide equivalent 190) were heated to 60° C. in a 10 liter three-necked flask equipped with a stirrer, dropping funnel and reflux condenser. 42.5 g (2.5 mols) of gaseous ammonia were then introduced into the reaction liquid over a period of 20 hours at the aforementioned temperature. 68.4 g of the thiodiglycol (catalyst) were then added, followed by the dropwise addition over a period of 3 hours at 60° C. of 1386 g (19.25 mols) of acrylic acid. The mixture was stirred at 60° C. until it had an acid number of 0 (titration with N/10 NaOH/thymol blue), followed by cooling to room temperature.

Application (a) 96 parts by weight of the reaction product of Example 1 were mixed with 4 parts by weight of benzoin isopropyl ether and adjusted with butyl acetate to a viscosity corresponding to a flow out time of 20 seconds from a DIN-4-cup. The mixture was then applied to sheets of printed paper in a layer thickness of approximately 15μ using a hand coater, and hardened under a Philips HTQ-7 lamp arranged at a distance of 8 cm. The hardened lacquer film was then resistant to solvents and tack-free. For results see Table I.

(b) 96 Parts by weight of the resin (reaction product of Example 1) were mixed with 4 parts by weight of 1-phenyl-1,2-propane-2-dione-O-benzoyl oxime and the resulting mixture again adjusted with butyl acetate to a flow out time of 20 seconds from a DIN-4-cup. The procedure was then as described in (a) above. A solvent-resistant and tack-free film was obtained. For results see Table I.

(c) 96 parts by weight of the reaction product of Example 1 were mixed with 4 parts by weight of benzophenone and 1 part by weight of triethanolamine and the mixture adjusted with butyl acetate to a viscosity corresponding to a flow out time of 20 seconds from a DIN-4-cup. The procedure was then as in (a) above. The hardened film was solvent-resistant and tack-free. For results see Table I.

(d) Comparison test with German Offenlegungsschrift No. 2,221,335

96 parts by weight of an unsaturated air-drying polyester resin of 2550 g of fumaric acid, 451 g of 1,2-propylene glycol, 1441 g of diethylene glycol, 941 g of trimethylol propane diallyl ether, 428 g of diethylene glycol monobutyl ether, were mixed with 4 parts by weight of benzoin isopropyl ether and the resulting mixture adjusted with butyl acetate to a flow out time of 20 seconds from a DIN-4-cup. The procedure was then as in (a) above. A film was produced on sheets of printed paper. A much longer exposure time was required to obtain hardening into a solvent-resistant tack-free film. For results see Table II.

TABLE I

| Air-drying epoxide resin according to Example 1: | |
|---|---|
| 4% of photoinitiator | Exposure time(seconds) |
| Benzoin isopropyl ether | 2 |
| 1-phenyl-1,2-propane-2-dione-O-benzoyl oxime | 1 |
| Benzophenone + 1% by weight of triethanolamine | 1 |

TABLE II

| Air-drying polyester resin according to German Offenlegungsschrift No. 2,221,335 | |
|---|---|
| 4% of photoinitiator | Exposure time(seconds) |
| Benzoin isopropyl ether | 5 |

EXAMPLE 2

3 mols=315.0 g of diethanolamine were added dropwise over a period of 3 hours at 60° C. to 6800 g of bisphenol-A-bisglycidyl ether (epoxide equivalent 190) accommodated in a 10 liter three necked flask equipped with a dropping funnel, stirrer and thermometer. After stirring for 2 hours, 68 g of triethyl amine (catalyst) were added, followed by the dropwise addition over a period of 2 hours at 60° C. of 2160 g (30 mols) of acrylic acid. After an acid number of 0 had been obtained, the mixture was stabilised with 0.02% by weight of hydroquinone monomethyl ether and cooled to 20° C.

Application 4 parts by weight of benzoin isopropyl ether, 4 parts by weight of 1-phenyl-1,2-propane-2-dione-O-benzoyl oxime and 4 parts by weight of benzophenone, together with 1% by weight of triethanolamine, were added to 96 parts by weight of the reaction product according to Example 2, followed by dilution with butyl acetate to give a viscosity corresponding to a flow out time of 20 seconds from a DIN-4-cup. The mixture was then applied to sheets of printed paper in a layer thickness of approximately 15μ using a hand coater and exposed to a Philips HTQ 7 lamp arranged at a distance of 8 cm until a solvent-resistant, tack-free film was obtained.

The exposure times are set out in Table III.

TABLE III

| Air-drying epoxide resin according to Example 2: | |
|---|---|
| 4% of photoinitiator | Exposure time(seconds) |
| Benzoin isopropyl ether | 2 |
| 1-phenyl-1,2-propane-2-dione-O-benzoyl oxime | 0.9 |
| Benzophenone + triethanolamine | 0.8 |

EXAMPLE 3

3400 g of bisphenol-A-bis-glycidyl ether were heated to 60° C. in a 6 liter three necked flask equipped with a stirrer, dropping funnel and reflux condenser. 160.5 g of 95% by weight ethanolamine (2.5 mols) were then added dropwise over a period of 3 hours. Following the addition of 34 g of thiodiglycol, 600 g (8.35 mols) of acrylic acid were added dropwise over a period of 2 hours. After stirring for 2 hours, the mixture was stabilised with 0.02% by weight of hydroquinone monomethyl ether and cooled to room temperature.

4 parts by weight of each of the photoinitiators identified in Table III were added to 96 parts by weight of the reaction product according to Example 3, followed by dilution with butyl acetate to a viscosity corresponding to a flow out time of 20 seconds from a DIN-4-cup. A 15μ thick layer of the mixture was applied to sheets of printed paper with a hand coater, and exposed to radiation for the following times in the same way as in Example 1a.

TABLE IV

| Air-drying epoxide resin according to Example 3: | |
|---|---|
| 4% of photoinitiator | Exposure time(seconds) |
| Benzoin isopropyl ether | 2 |
| 1-phenyl-1,2-propane-2-dione-O-benzoyl oxime | 0.9 |
| Benzophenone + triethanolamine | 0.8 |

EXAMPLE 4

70 parts by weight of the reaction product of Example 1 were dissolved in 30 parts by weight of methyl methacrylate, followed by the addition of 2.5 parts by weight of benzoin isopropyl ether, 1-phenyl-1,2-propane-2-dione-O-benzoyl oxime and benzophenone/1% triethanolamine. The mixture was applied to glass plates in a layer thickness of 500μ using a film coater and exposed for 30 seconds to the light of super actinic fluorescent tubes (Osram L-40 watt/70-1 or Philips Tlak 40 watt/05) and for 10 and 18 seconds to the light of a high-pressure mercury lamp (Philips HTQ 7) arranged at a distance of 10 cm. The pendulum hardnesses according to Albert-Koenig were determined after storage in the dark for 1 hour. The following results were obtained:

TABLE V

| Pendulum hardnesses according to DIN 53 157 (in seconds) | | |
|---|---|---|
| 2.5% of photoinitiator | 10 secs.HTQ | 18 secs HTQ |
| Benzoin isopropyl ether | 178 | 182 |
| 1-phenyl-1,2-propane-2-dione-O-benzoyl oxime | 187 | 190 |
| Benzophenone + 1% triethanolamine | 186 | 190 |

EXAMPLE 5

A mixture was prepared from 70 parts by weight of the reaction product of Example 2, 30 parts by weight of styrene and 2.5% by weight of each of the various photoinitiators identified in Table VI, followed by application to glass plates, hardening and testing under the conditions of Example 4. The following results were obtained:

TABLE VI

| Pendulum hardnesses according to DIN 53 157 (in seconds) | | |
|---|---|---|
| 2.5% of photoinitiator | 10 secs.HTQ | 18 secs HTQ |
| Benzoin isopropyl ether | — | 19 |
| 1-phenyl-1,2-propane-2-dione-O-benzoyl oxime | 186 | 195 |

EXAMPLE 6

70 parts by weight of the reaction product of Example 1 were mixed with 30 parts by weight of methyl methacrylate, followed by the addition of 2% of 100% benzoyl peroxide and 1% of diethyl aniline. 500μ thick films were then coated onto glass plates using a film coater and the periods of time elapsing before droplet drying and stamp testing "0" measured.

COMPARISON EXAMPLE 70 g of a polyester obtained by condensing 1765 parts by weight of maleic acid anhydride, 756 parts by weight of ethylene glycol, 405 parts by weight of 1,3-butanol diol and 1540 parts by weight of trimethylol propane diallyl ether, were stabilised with 0.83 parts by weight of hydroquinone and dissolved in 30 g of styrene. 100 parts by weight of the resulting mixture were mixed with 20 parts by weight of styrene, followed by the addition of 2 parts by weight of benzoyl peroxide and 1 part by weight of dimethyl aniline. A 500μ thick film was then coated onto glass plates and the periods of time elapsing before droplet drying and stamp testing "0" were measured.

TABLE VII

| Drying times with conventional hardening | | |
|---|---|---|
|  | Droplet drying (minutes) | Stamp testing (hours) |
| Resin mixture according to Example 6 | 80 | 4–5 |
| Polyester according to the Comparison Example | 100 | 8 |

EXAMPLE 7

680 parts by weight of bisphenol A-bis-glycidyl ether (epoxide equivalent 190) were heated to 60° C. in a three-necked flask equipped with a stirrer, dropping funnel and reflux condenser. 4.25 parts by weight of gaseous ammonia were then introduced into the solution over a period of 20 hours. After 6.8 parts by weight of thiodiglycol had been added, 193 parts by weight of acrylic acid were added dropwise over a period of 3 hours, again at 60° C. The mixture was cooled to room temperature on reaching an acid number of 0.

96 parts by weight of the resin were mixed with 4 parts by weight of α-(β-carbomethoxy)-ethyl benzoin isopropyl ether and adjusted with butyl acetate at 20° C. to a viscosity of 20 seconds (DIN-4-cup). The mixture was then applied to sheets of printed paper with a hand coater (layer thickness 15μ) and hardened under a Philips HTQ 4 lamp arranged at a distance of 8 cm. The exposure time required for complete hardening was 1 second.

When stored for 4 weeks at 60° C., the mixture did not change in any way, whereas a corresponding mixture containing 4% by weight of benzoin isopropyl ether gelled over a period of 18 hours.

EXAMPLE 8

70 parts by weight of the amine-modified reaction product of Example 3 were dissolved in 30 parts by weight of methyl methacrylate, followed by the addition of 2.5 parts by weight of each of the photoinitiators identified in Table VIII. The mixtures were coated onto glass plates with a film coater (layer thickness 500μ) and exposed for 30 seconds to the light of super-actinic fluorescent tubes and for 10 and 18 seconds to the light of a high-pressure mercury lamp (Philips HTQ 7) arranged at a distance of 10 cm. After the layers had cooled to room temperature, they were found to have the following pendulum hardnesses (determined in accordance with DIN 53 157)

TABLE VIII

|  | 10 secs HTQ lamp | 18 secs HTQ lamp |
|---|---|---|
| α-(β-carbomethoxy)-ethyl benzoin isopropyl ether | 170 secs | 190 secs |
| α-allyl benzoin ethyl ether | 182 | 190 |
| benzoin isopropyl ether (Comparison Test) | 178 | 182 |

The comparison mixture containing benzoin isopropyl ether had gelled after storage at room temperature for only 1 day, whilst the other two mixtures were still the same after storage at room temperature for 9 weeks.

In addition, the photoinitiators identified below were used and the pendulum hardnesses indicated obtained.

| Photoinitiator | Pendulum hardness according to DIN 53 157 (in seconds) | |
|---|---|---|
|  | 10 secs HTA | 18 secs HTQ |
| α-methyl benzoin methyl ether | 169 | 173 |
| α-methyl benzoin allyl ether | 180 | 184 |
| α-benzyl benzoin methyl ether | 174 | 179 |
| α-ethyl benzoin ethyl ether | 176 | 180 |
| α-allyl benzoin ethyl ether | 168 | 174 |
| 2-cyanoethyl benzoin isopropyl ether | 169 | 174 |
| α-(2-carbethoxyethyl)-benzoin isopropyl ether | 179 | 184 |
| α-(2-carbonamidoethyl)-benzoin methyl ether | 173 | 179 |
| α-(2-methoxycarbonyl)-benzoin isopropyl ether | 178 | 183 |
| α-(hydroxymethyl)-benzoin isopropyl ether | 176 | 186 |

EXAMPLE 9

2780 g of hexahydrophthalic acid diglycidyl ether (epoxy equivalent 172) were heated to 60° C. in a 6 liter three-necked flask equipped with a stirrer, dropping funnel and reflux condenser. 157.5 (1.5 mols) of diethanolamine were then added dropwise over a period of 2 hours at the aforementioned temperature. After another 2 hours' stirring, 29.3 g of thiodiglycol were added, followed by the dropwise addition over a period of 3 hours at 60° C. of 710 g (9.3 mols) of acrylic acid. The mixture was then stirred at this temperature until it had an acid number of 0 (titration with n/10 NaOH/thymol blue) followed by cooling to room temperature.

Application 4 parts by weight of α-(2-cyanoethyl)benzoin ethyl ether, 1-phenyl-1,2-propane-2-diol-O-benzoyl oxime and 4 parts by weight of benzophenone/1% by weight of triethanolamine, were added to 96 parts by weight of the reaction product of Example 9, followed by dilution with butyl acetate to a viscosity corresponding to a flow out time of 20 seconds from a DIN-4-cup. The mixture was then applied to sheets of printed paper with a hand coater (layer thickness approximately 15μ) and exposed to the light of a Philips PTQ-7 lamp arranged at a distance of 8 cm until a solvent-resistant(cyclohexanone) and tack-free film was obtained. The exposure times are shown in Table IX.

TABLE IX

| Air-drying epoxide resin according to Example 9 | |
|---|---|
| 4% of photoinitiator | Exposure time(seconds) |
| α-(2-cyanoethyl) benzoin ethyl ether | 2 |
| 1-phenyl-1,2-propane-2-diol-O-benzoyl oxime | 1 |
| Benzophenone + 1% by weight of triethanolamine | 1.0 |

We claim:

1. An air-drying coating composition hardenable by UV-light comprising the product of reaction, at a temperature of 20° to 90° C. and in the presence of 0.001 to 0.1% by weight, based on the total compositions, of a polymerization inhibitor, of a polyepoxide with 0.01 to 0.5 NH-equivalents, based on the epoxide equivalent, of at least one nitrogen compound selected from the group consisting of ammonia, and aliphatic and cycloaliphatic primary and secondary amines, which intermediate product has subsequently been reacted with 0.99 to 0.5 carboxyl equivalents, based on one epoxide equivalent, of at least one member selected from the group consisting of acrylic acid and methacrylic acid, at least 60% of the epoxide groups of said polyepoxide having been so reacted.

2. An air-drying coating composition of claim 1 including 0.1 to 20% by weight, based on polymerizable components, of a photoinitiator for said composition.

3. An air-drying coating composition of claim 1 wherein the polyepoxide is selected from the group consisting of polyglycidyl ethers of bisphenol A, phthalic acid diglycidyl ester, isophthalic acid diglycidyl ester, terephthalic acid glycidyl ester, hexahydrophthalic acid diglycidyl ester and the reaction product of 1 mol of 1,1,1-trimethylolpropane and 3 mols of at least one member selected from the group consisting of hexahydrophthalic acid anhydride and phthalic acid anhydride.

4. An air-drying coating composition of claim 1 wherein said at least one nitrogen compound is of the formula

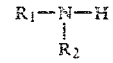

wherein each of $R_1$ and $R_2$ is selected from the group consisting of hydrogen, alkyl having 1 to 18 carbon atoms and β-hydroxyalkyl having 2 to 18 carbon atoms.

5. An air-drying coating composition of claim 1 wherein the at least one nitrogen compound is selected from the group consisting of ammonia, ethanolamine, diethanolamine, 1-amino-2-propanol, diisopropanolamine, dimethylamine, diethylamine, dibutylamine, methylamine, ethylamine and butylamine.

6. An air-drying coating composition including from 5 to 50% by weight, based on the weight of the product of reaction defined in claim 1, of at least one member selected from the group consisting of esters of acrylic acid and methacrylic acid with aliphatic alcohols having 1 to 8 carbon atoms, cycloaliphatic alcohols having 5 to 6 carbon atoms and araliphatic alcohols having 7 to 8 carbon atoms; hydroxyalkyl esters of acrylic acid and methacrylic acid having 2 to 4 carbon atoms in the hydroxyalkyl moiety; polyacrylates and polymethacrylates of glycols having 2 to 6 carbon atoms and of polyols having 3 to 4 hydroxy groups and 3 to 6 carbon atoms; styrene, methylstyrene, divinylbenzene, N-methylolacrylamide, N-methylolmethacrylamide, the corresponding N-methylolalkyl ethers having 1 to 4 carbon atoms in the alkyl ether group and the corresponding N-methylolallyl ethers; vinylalkyl ethers having 1 to 4 carbon atoms in the alkyl moiety; trimethylolpropane diallyl ether monoacrylate; trimethylolpropane diallyl ether monomethacrylate; vinylpyridine; N-vinylcarbazole; triallylphosphate and triallylisocyanurate.

7. An air-drying coating composition of claim 1 including from 5 to 50% by weight, based on the weight of the mixture, of an inert solvent.

8. An ultraviolet curable acrylate resin composition consisting essentially of a reaction product of (i) a secondary monoamine selected from the group consisting of dimethylamine, diethylamine, methylethylamine, diisopropylamine, piperidine, methylcyclohexyl amine, methylethanolamine, phenylethanolamine and diisopropanolamine, (ii) acrylic acid and (iii) a polyepoxide in a ratio of 0.01 to 0.5 chemical equivalents of the monoamine per chemical equivalent of the polyepoxide and 0.99 to 0.5 chemical equivalents of the acrylic acid per chemical equivalent of the polyepoxide wherein said polyepoxide is a glycidyl ether of 2,2-bis(4-hydroxyphenyl) propane and wherein said reaction product is prepared by contacting components (i), (ii) and (iii) at reaction temperatures of 20° C. to 90° C.

9. A composition according to claim 8 wherein the composition consists essentially of said secondary monoamine, (ii) said acrylic acid and (iii) said polyepoxide in a ratio of 0.05 to 0.3 chemical equivalents of the monoamine per chemical equivalent of the polyepoxide and 0.7 to 0.95 equivalents of the acrylic acid per chemical equivalent of the polyepoxide.

10. A composition according to claim 9 wherein said secondary monoamine is diisopropanolamine.

11. The method of preparing an ultraviolet curable acrylate resin composition which comprises contacting in a reactor at a temperature of 20° C. to 90° C. and in the absence of additional catalysts (i) a secondary monoamine selected from the group consisting of dimethylamine, diethylamine, methylethylamine, diisopropylamine, piperidine, methylcyclohexyl amine, methylethanolamine, phenylethanolamine and diisopropanolamine, (ii) acrylic acid and (iii) a polyepoxide in a ratio of 0.01 to 0.5 chemical equivalents of the monoamine per chemical equivalent of the polyepoxide and 0.99 to 0.5 chemical equivalents of the acrylic acid per chemical equivalent of the polyepoxide wherein said polyepoxide is a glycidyl ether of 2,2-bis(4-hydroxyphenyl)-propane and wherein said polyepoxide is contacted first with said secondary monoamine and then with said acrylic acid.

12. The method according to claim 11 which comprises contacting (i) said secondary monoamine, (ii) said acrylic acid and (iii) said polyepoxide in a ratio of 0.05 to 0.3 chemical equivalents of the monoamine per chemical equivalent of the polyepoxide and 0.7 to 0.95 chemical equivalents of the acrylic acid per chemical equivalent of the polyepoxide.

13. The method according to claim 12 wherein said secondary monoamine is diisopropanolamine.

* * * * *

UNITED STATES PATENT OFFICE
CERTIFICATE OF CORRECTION

Patent No. 4,253,918    Dated March 3, 1981

Inventor(s) Hans-Joachim Traenckner

It is certified that error appears in the above-identified patent and that said Letters Patent are hereby corrected as shown below:

In the title page, Item [73] should read

"Assignee: Bayer Aktiengesellschaft, Fed. Rep. of Germany and in line 4 of Item [57], "epoxid" should read --epoxide--.

Signed and Sealed this

Seventh Day of July 1981

[SEAL]

Attest:

RENE D. TEGTMEYER

Attesting Officer     Acting Commissioner of Patents and Trademarks